March 7, 1944. E. C. GROGHAN 2,343,549
AUTOMATIC CONTROL MEANS FOR MAINTAINING CONSTANT LIQUID LEVELS
Filed June 23, 1941 4 Sheets-Sheet 1
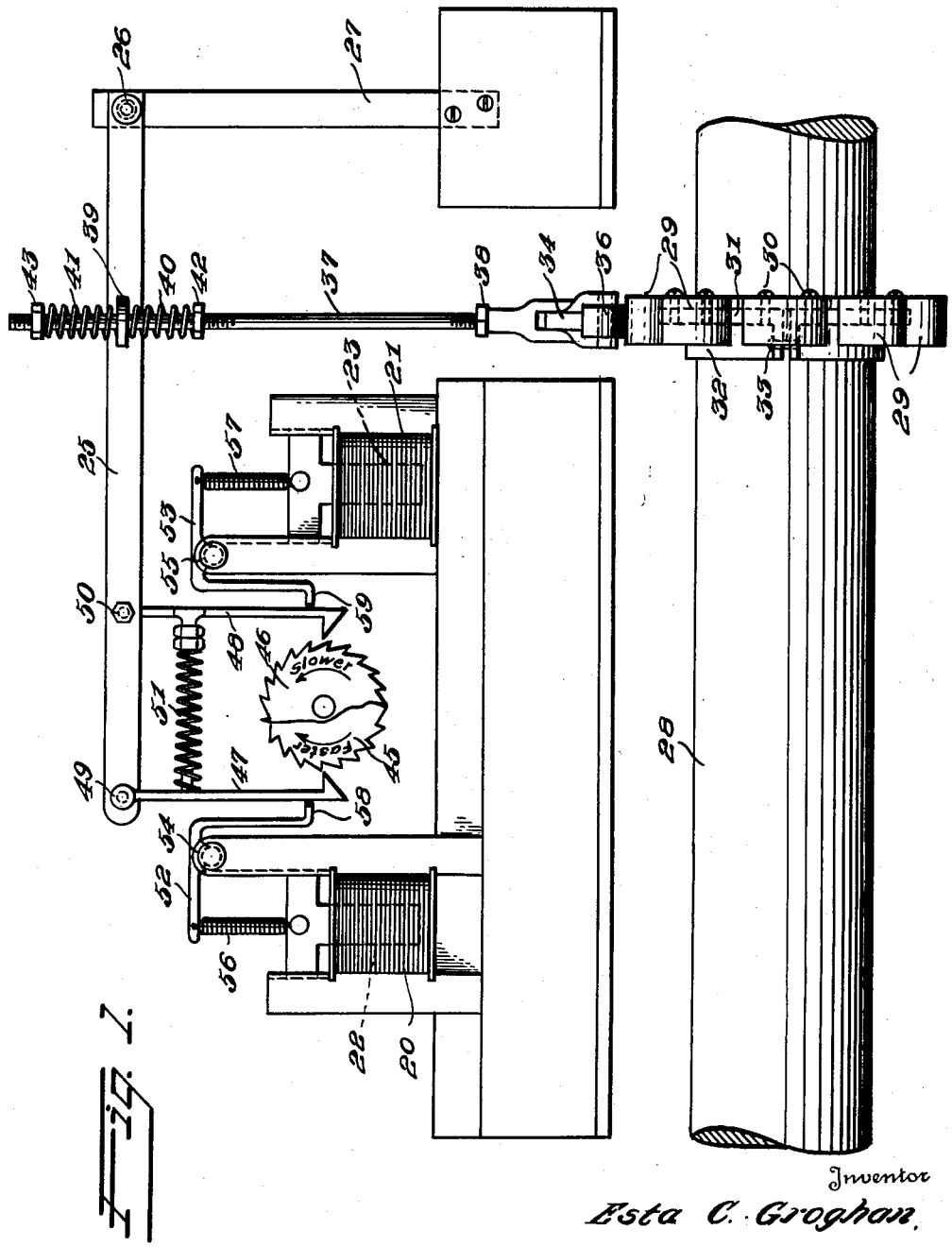
Inventor
Esta C. Groghan
By George E. Cook.
Attorney

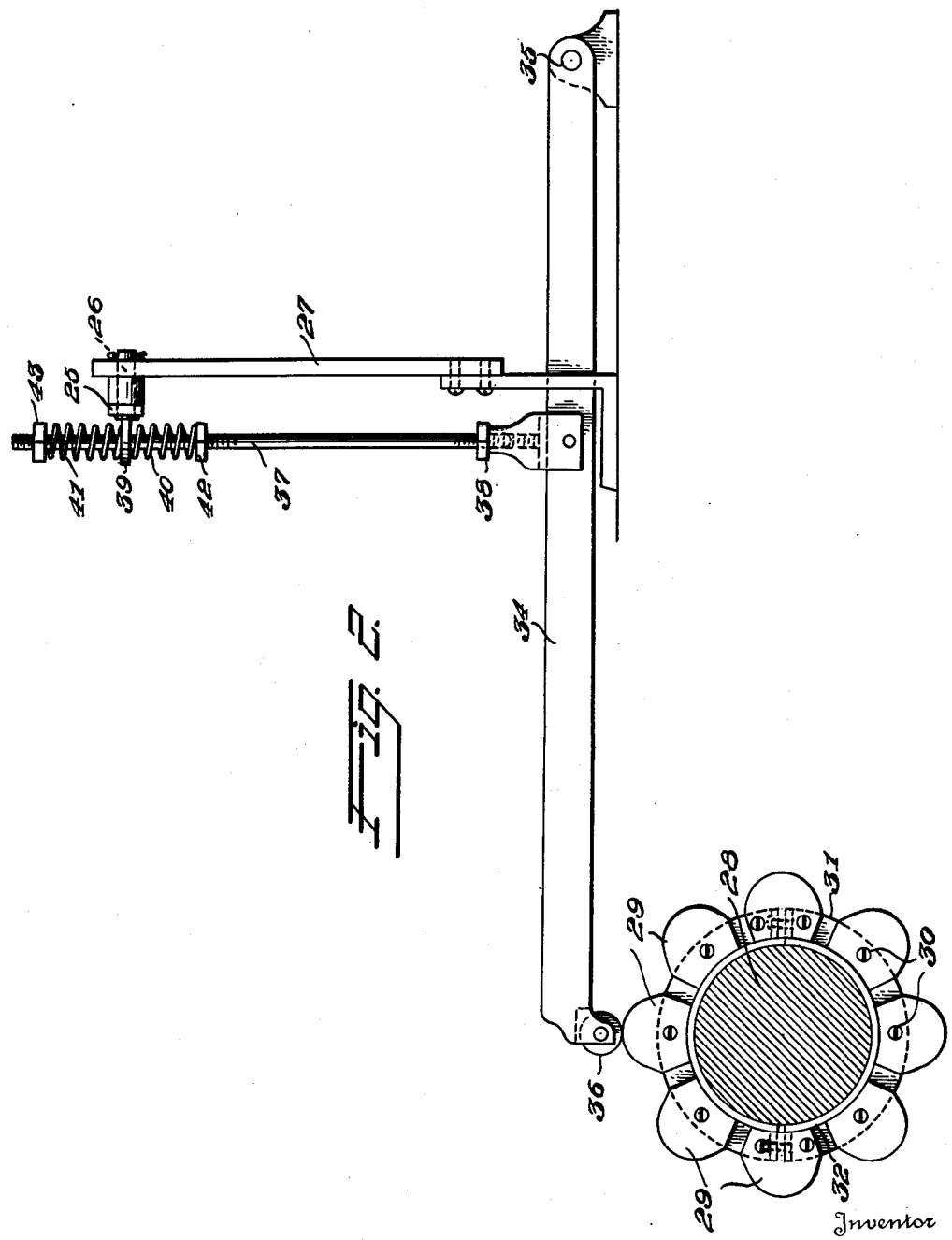

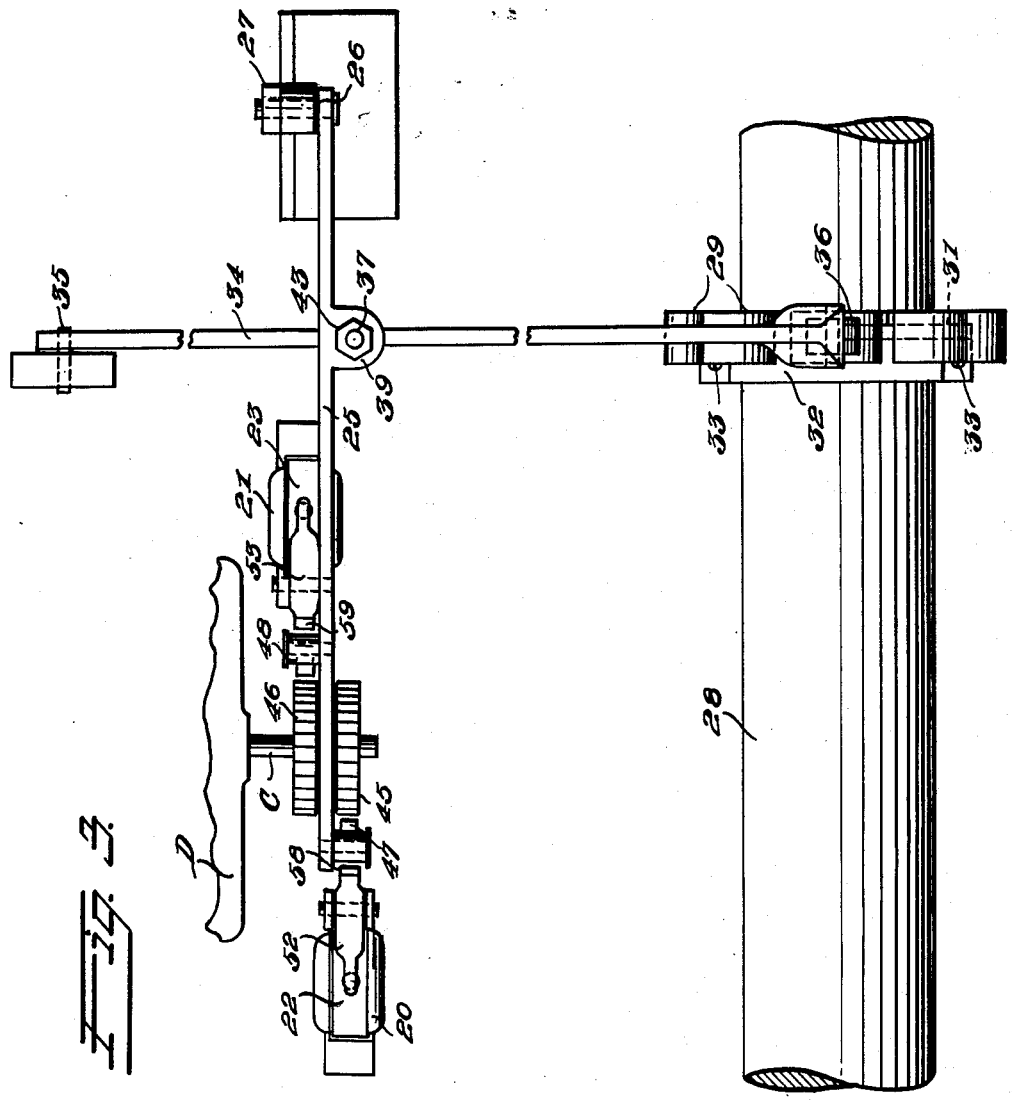

March 7, 1944. E. C. GROGHAN 2,343,549
AUTOMATIC CONTROL MEANS FOR MAINTAINING CONSTANT LIQUID LEVELS
Filed June 23, 1941 4 Sheets-Sheet 4
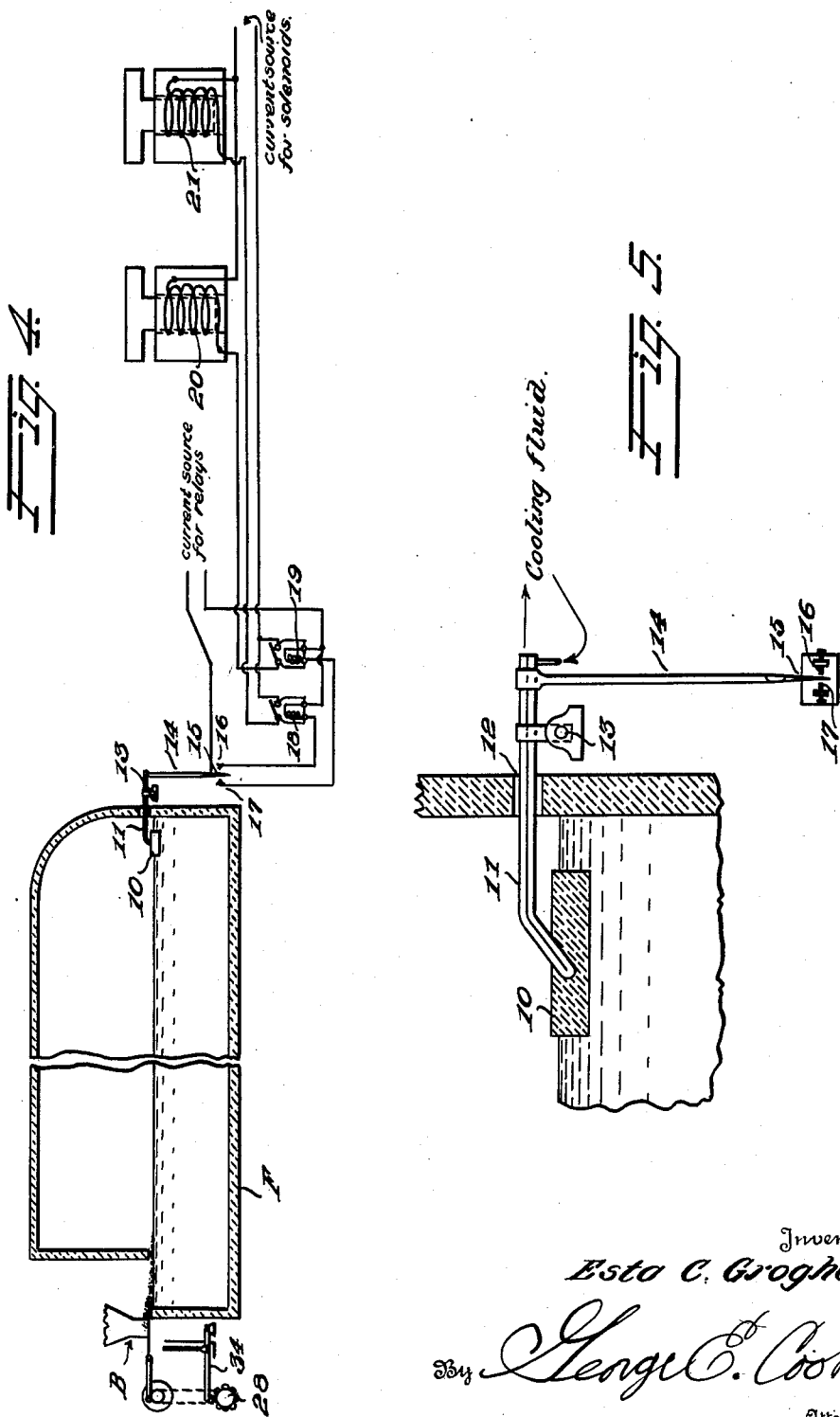
Inventor
Esta C. Groghan
By George E. Cook
Attorney Patented Mar. 7, 1944

2,343,549

UNITED STATES PATENT OFFICE 2,343,549

AUTOMATIC CONTROL MEANS FOR MAINTAINING CONSTANT LIQUID LEVELS

Esta C. Groghan, Clarksburg, W. Va., assignor to Rolland Glass Company, Clarksburg, W. Va., a corporation of West Virginia Application June 23, 1941, Serial No. 399,411

6 Claims. (Cl. 74—150)

The present invention relates to automatic control means for maintaining a constant liquid level.

More specifically, the invention relates to improved means in operative association with means for feeding material or liquid into a container and controllable by changes in the level of the liquid within the container for automatically varying the feed thereof and thereby maintaining a substantially uniform level within the container.

While the improved means in accordance with this invention is adaptable to use wherein it is desirable to maintain a constant level of any liquid, it finds a particular adaptation in connection with molten glass in a glass furnace.

In the art of glass manufacturing, a glass furnace is charged with batch materials by means of a batch feeder and the batch is then changed to a molten condition by the heating means employed. It is highly important that the batch feeder be so controlled as to maintain a substantially uniform level of the molten glass within the furnace for reducing waves and variation of thickness of the product.

While controllable batch feeders have heretofore been proposed in an attempt to maintain a constant glass level, such control was effected by means of timing devices set by hand to compensate for variations in withdrawal of material or a changing efficiency of the feeder due to slight changes in the physical condition of the batch. Such prior structures, however, required the constant attention of an operator and even with most skillful operation failed to maintain a liquid level within such slight range of variation as is required for the maximum quality of product.

Furthermore, it is highly desirable to maintain a substantially uniform liquid level in many other instances, such for example, as in reservoirs in order to provide for maximum water consumption while at the same time avoiding waste thereof.

It is accordingly a primary object of this invention to provide means for automatically varying the rate of feeding liquifiable material into a container to maintain a substantially constant liquid level therein irrespective of the rate or frequency of withdrawal of liquid therefrom.

It is a further object of the invention to provide means for maintaining a substantially constant level of a liquid within a container which is operated by rise or fall of the liquid level for automatically varying the rate of feeding liquid forming material into the container.

It is a still further object of the invention to provide liquid level control means of the above-noted general character which is relatively simple in construction, accurate and dependable in operation, and which is entirely automatic, thereby relieving an operator of the heretofore required constant attention in manually varying the rate of charging a container with a liquid forming material.

For a more complete understanding of the nature and objects of the invention, reference will be had to the following detailed description taken in connection with the accompanying drawings, wherein:

Fig. 1 is a side elevational view of the liquid level controlling mechanism in accordance with a preferred embodiment of the invention;

Fig. 2 is a partial end view of the mechanism of Fig. 1 disclosing in particular the power means operated by the batch feeder;

Fig. 3 is a top plan view of the mechanism of Fig. 1;

Fig. 4 is a diagrammatic representation of the level control means in operative association with a glass furnace and showing the solenoid energizing means; and Fig. 5 is an enlarged fragmental view partially in section and partially in elevation and showing in particular that portion of the controlling mechanism which is directly associated with the molten mass and further showing a fluid cooled float lever for use with glass furnaces.

Referring now in detail to the drawings by the use of reference characters, and wherein like characters designate like parts in the different views, F designates a glass furnace which in accordance with usual practice is equipped with a mechanical batch feeder B driven by suitable power through a variable speed drive D. The variable speed drive D includes a rotatable control shaft C which upon being rotated clockwise increases the rate of feed and upon being rotated counter-clockwise decreases the rate of feed.

The specific construction of the batch feeder, variable speed drive, and the particular relation of the speed control shaft to the variable speed drive do not in themselves constitute a part of this invention, the invention relating to automatic means for rotating the shaft C for maintaining a constant liquid level.

The constant liquid level is in fact automatically maintained by slight variations in such level and accordingly the invention includes a float 10 which when used in a glass furnace as illustrated is of a refractory or other material and is supported by one end of a lever 11 which extends through a slot 12 in a wall of the furnace and is pivoted externally of the furnace as at 13. Depending from the end of lever 11 opposite the float 10 is a rod 14 having a contactor 15 for engagement with contact 16 or contact 17 as occasioned by rise or fall of the float 10 in corresponding changes of the liquid glass level in the furnace F. The contacts 16 and 17 are illustrated in Fig. 5 as being adjustable whereby contactor 15 will engage one or the other of the contacts 16 or 17 upon slight change of level of the liquid glass. The engagement of contactor 15 with contact 16 or contact 17 closes a circuit through relays 18 or 19 and which in turn close circuits of the corresponding solenoids 20 or 21 whereby the latter are alternately energized upon fall or rise of the level of the liquid glass, as will be apparent upon inspection of Fig. 4.

The solenoids 20 and 21 include the cores 22 and 23 respectively and the movement of these cores is relied upon to select the direction of rotation of the speed control shaft C in a manner now to be described.

An elongated arm 25 is pivotally connected at one end thereof as at 26 to a suitable support 27 and the arm extends normally horizontal and above the solenoids 20 and 21 as is clearly indicated in Fig. 1. This arm is subjected to a constant vertical vibration about its pivot 26 by the means now to be described.

A constantly rotating shaft 28 is suitably driven from the batch feeder as indicated in Fig. 4 or by any other suitable means.

This shaft supports a plurality of circumferentially arranged cams 29 secured as by screws 30 to the vertical flanges 31 of a two part ring 32 held in rigid contact with the shaft 28 by means of screws 33.

An arm 34 extends substantially horizontally and at right angles to arm 25 and is pivotally connected at one end thereof as at 35.

The opposite end of this arm rotatably supports a roller 36 which successively engages the cams 29 upon rotation of shaft 28 with a consequent vertical vibration of the arm 34 about its pivot 35.

A vertical rod 37 is adjustably connected at its lower end to the arm 34 intermediate the ends thereof as at 38 and the rod adjacent its upper end extends through an ear 39 on the arm 25 and coil springs 40 and 41 surround the rod 37 with their adjacent ends abutting the ear 39 and their opposed ends engaging nuts 42 and 43 threaded on the rod for adjusting the compression of the springs.

It will be seen that with this construction the vibration of arm 34 is yieldably transmitted to the arm 25 whereby possible injury to the mechanism further to be described is avoided.

Oppositely rotative ratchet wheels 45 and 46 are secured to the speed control shaft C which shaft, as indicated in Figs. 1 and 3, extends between the solenoids 20 and 21 and below the arm 25 adjacent the free end thereof.

Pawls 47 and 48 are pivotally connected as at 49 and 50 to the arm 25 and depend therefrom with their operating ends in adjacency to the respective ratchet wheels 45 and 46 but normally held out of operative contact therewith by means of a coil spring 51 engaging the pawls below their pivotal connections 49 and 50.

L-shaped levers 52 and 53 are pivotally connected to suitable supports as at 54 and 55 and have the free ends of their horizontal arms yieldably connected with the respective solenoid cores 22 and 23 by means of coil springs 56 and 57 and the free ends of the vertical arms of the levers are provided with contact feet 58 and 59 for contact with the respective pawls 47 and 48 to alternately move same into operative engagement with the ratchet wheels 45 and 46 against the yieldable resistance of the spring 51.

From the foregoing description, it should be appreciated that the improved construction according to this invention provides for automatically maintaining a substantially constant liquid level as the float 10 will rise or fall with corresponding changes in the liquid level as governed by the feed of the liquid into or the discharge thereof from the glass furnace or other receptacle.

Upon such rise or fall of the float, the lever 11 will pivot at 13 and bring the contactor 15 into circuit closing engagement with contact 17 or contact 16 as the case may be.

Thus upon engagement of contactor 15 with the contact 17 the solenoid 21 will be energized, its core 23 will accordingly be drawn downwardly and which through the spring 57 will swing lever 53 clockwise. Upon such swinging of the lever its foot 59 will engage and move the pawl 48 into driving engagement with the ratchet wheel 46 and as the pawl 48 is moved vertically upwards by the constantly vertically vibrating arm 25, such ratchet wheel will be stepped counter-clockwise an angular distance of one tooth.

Such movement of the ratchet wheel will rotate the speed control shaft C in a corresponding direction and to a like angular extent whereby slowing the rate of feed of the batch feeder B through the variable speed drive D as is indicated by the arrow on the ratchet wheel 46.

Upon fall of the liquid level, the solenoid 20 will be energized through the relay 18 and a corresponding action will result in the ratchet wheel 45 being rotated clockwise by the pawl 47 with a resulting increase in the rate of batch feed as is indicated by the arrow on the ratchet wheel 45.

In the application of the improved control mechanism to glass furnaces as herein illustrated wherein intense heat may adversely affect the sensitive control means, such is obviated by means of a fluid cooled lever 11 as illustrated in Fig. 5.

Such lever may desirably consist of a tube returned upon itself where engaged with the float 10 and having a cooling fluid constantly circulated therethrough as is indicated by the legends in Fig. 5. The cooling fluid may desirably be supplied by flexible conduits connected with the free ends of the tube.

While the improved automatic level control means is illustrated herein as in operative association with a glass furnace, and with which it finds a preferred adaptation, nevertheless, it will be obvious that same will be highly adaptable for use with reservoirs and similar structures wherein it is desirable to maintain a substantially constant liquid level.

It is to be particularly noted that the device is entirely automatic and acts to maintain a substantially constant level of a liquid through slight variations of such level.

While I have disclosed but a single specific embodiment of the invention, such is to be considered as illustrative only, and not restrictive, the scope of the invention being defined in the subjoined claims.

What I claim and desire to secure by U. S. Letters Patent is:

1. In combination, a rotatable shaft, a control shaft, and means for alternately rotating the control shaft in opposite directions from the rotatable shaft comprising a pair of ratchet wheels on the control shaft, one for rotating it in one direction and the other for rotating it in the opposite direction, a pair of pawls, one cooperating with each ratchet wheel, a spring normally holding the pawls out of operative engagement with the respective ratchet wheels, circumferentially arranged cam projections on the rotatable shaft, a pivotally supported arm having a follower for successive engagement by the cam projections for oscillating the arm, a pivotally supported arm to which the pawls are pivotally connected, means interconnecting said arms for vibrating the pawls, and means for alternately moving the vibrated pawls into driving engagement with the respective ratchet wheels.

2. The structure according to claim 1 wherein said first means comprises a rod having one end thereof adjustably connected with said first arm and the opposite end thereof yieldably connected with the second arm.

3. The structure according to claim 1 wherein said last means comprises a pair of pivotally supported L-shaped levers each having one arm thereof in engagement with a respective one of said pawls, the other arms of said L-shaped levers having yieldable connections with the cores of intermittently and alternately energized solenoids.

4. In combination, a horizontal rotatable shaft, a horizontal control shaft above and at right angles to the rotatable shaft, a pair of ratchet wheels secured to the control shaft, one for rotating it in one direction and the other for rotating it in the opposite direction, circumferentially arranged cams on the rotatable shaft, a horizontal arm pivotally supported at one end and having a follower at the other end for successive engagement with said cams for vibrating the arm, a second horizontal arm above and at right angles to the first arm and being pivotally supported at one end thereof, a vertical rod interconnecting both arms for vibration of the second arm from the first arm, a pair of vertically disposed pawls pivotally connected to the second arm adjacent the free end thereof, each pawl cooperating with a respective one of said ratchet wheels, means normally holding said pawl out of operative engagement with the ratchet wheels, and means for intermittently and alternately moving the pawls into driving engagement with the respective ratchet wheels.

5. The structure according to claim 4 wherein said means comprises a lever operatively engaged with each pawl, and intermittently energized solenoids for alternately operating said levers.

6. The structure according to claim 4 wherein said vertical rod has one end thereof adjustably connected with the first arm, the other end of said rod extending through an ear on the second arm and a coil spring on said rod on each side of the ear, adjacent ends of the springs engaging the ear and the opposite ends of the springs engaging stops on the rod.

ESTA C. GROGHAN.